US008385869B2

(12) United States Patent
Feenaghty et al.

(10) Patent No.: US 8,385,869 B2
(45) Date of Patent: Feb. 26, 2013

(54) EMBEDDED MODULE RECEIVER NOISE PROFILING

(75) Inventors: Dennis Michael Feenaghty, Solana Beach, CA (US); Christopher Bryan Bowman, San Diego, CA (US); Gregory Alan Breit, San Diego, CA (US); Paul Guckian, La Jolla, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 891 days.

(21) Appl. No.: 12/144,484

(22) Filed: Jun. 23, 2008

(65) Prior Publication Data

US 2009/0318103 A1    Dec. 24, 2009

Related U.S. Application Data

(60) Provisional application No. 60/986,165, filed on Nov. 7, 2007.

(51) Int. Cl.
*H04B 17/00* (2006.01)
(52) U.S. Cl. .......... 455/226.2; 455/423; 455/456.1; 455/422.1; 455/12.1
(58) Field of Classification Search .......... 455/226.2, 455/423, 456.1, 422.1, 12.1
See application file for complete search history.

(56) References Cited

U.S. PATENT DOCUMENTS

| | | | | |
|---|---|---|---|---|
| 6,131,031 | A * | 10/2000 | Lober et al. | 455/444 |
| 7,323,884 | B2 * | 1/2008 | Stojcevic | 324/627 |
| 7,519,329 | B2 * | 4/2009 | Qi et al. | 455/63.1 |
| 7,522,918 | B2 * | 4/2009 | Wachter et al. | 455/423 |
| 2003/0224751 | A1 | 12/2003 | Vanderhelm et al. | |
| 2006/0293019 | A1 | 12/2006 | Tandy | |
| 2007/0042706 | A1 * | 2/2007 | Ledeczi et al. | 455/3.01 |

FOREIGN PATENT DOCUMENTS

| | | |
|---|---|---|
| JP | 02075228 | 3/1990 |
| JP | 2000125149 A | 4/2000 |
| JP | 2002223195 A | 8/2002 |
| JP | 2006325252 A | 11/2006 |
| WO | WO9615594 | 5/1996 |

OTHER PUBLICATIONS

International Search Report and Written Opinion—PCT/US2008/082702, International Search Authority—European Patent Office—Jul. 14, 2009.
Taiwan Search Report—TW097143240—TIPO—Nov. 6, 2011.

* cited by examiner

*Primary Examiner* — Sanh Phu
(74) *Attorney, Agent, or Firm* — Ramin Mobarhan

(57) ABSTRACT

A self-test prediction system predicts the impact that a host device has on an embedded wireless device's receiver performance by recording the wireless device's received power. No carrier or pilot signal is necessary to predict the impact. The wireless device's embedded receiver monitors its own received power (e.g., RSSI) from any type of radiated noise from the host device. For receivers that do not provide RSS referenced to absolute power, an external reference tone can be used in order to scale the measured receiver carrier to noise or signal to noise data to an absolute power. The increase in measured received power on the wireless device's receiver correlates to the impact the host device will have on the embedded wireless device's receiver sensitivity performance, providing a faster approach with less external equipment than current approaches that use external equipment to simulate the wireless device's forward link signal.

33 Claims, 8 Drawing Sheets

EMBEDDED MODULE RECEIVER NOISE PROFILING

CLAIM OF PRIORITY UNDER 35 U.S.C. §119

The present Application for Patent claims priority to Provisional Application No. 60/986,165 entitled "SYSTEMS AND METHODS FOR PREDICTING THE PERFORMANCE OF AN EMBEDDED WIRELESS DEVICE RECEIVER BY MEASURING THE RECEIVER AUTOMATIC GAIN CONTROL IN THE ABSENCE OF SIGNAL CARRIER" filed 7 Nov. 2007, and assigned to the assignee hereof and hereby expressly incorporated by reference herein.

TECHNICAL FIELD

The exemplary embodiments of the invention relate to computer and computer-related technology. In particular, the exemplary embodiments of the invention relate to systems and methods for predicting the performance of an embedded wireless device receiver by measuring the received signal strength (e.g., automatic gain control (AGC), RSSI, SNR, etc.) in the absence of a signal carrier. For receivers that do not provide RSS referenced to absolute power, an external reference tone can be used in order to scale the measured receiver carrier-to-noise or signal-to-noise data to an absolute power.

BACKGROUND

With advances in computing and communication technology, increasingly devices integrate a number of components to increase their versatility and performance. Many of these components emit electromagnetic noise that can couple into a receiving antenna of the device, degrading radiated sensitivity. Even for devices that exploit unprotected frequency spectra (e.g., WiFi, WiMAX, etc.), degradation in performance can cause customer dissatisfaction and support costs.

Upfront testing costs can be even greater for devices that exploit protected spectra. Total Isotropic Sensitivity (TIS) testing is required to certify any new device for use on commercial networks and is essential to ensure a minimum quality of forward link service. However, TIS testing is a costly and time consuming process that requires formal testing at carrier designated certified labs (e.g., Cellular Telecommunications and Internet Association (CTIA).

Conventionally, a near-field probe can locate the general location within a device that is causing radio frequency (RF) emissions. However, the fact that such RF emissions are occurring does not necessarily mean that these emissions will couple into an antenna of the device or otherwise degrade performance. Consequently, such testing can result in unnecessary modifications before TIS testing or prove to be a time consuming method of troubleshooting after a TIS testing failure.

As an example of devices that are greatly disadvantaged by such certification requirements, notebook vendors routinely offer multiple hardware configurations for the same base model, with different processor speed, drive type, or display type, etc. Each configuration potentially has a different RF emission profile with the possibility of new interference sources in a Wireless Wide Area Network (WWAN) module receiver band or other wireless format. Each configuration necessitates fresh evaluation of radiated sensitivity and this adds significant overhead to the introduction of minor device revisions and configurations. This is a particular if not unique barrier for notebook vendors.

As another example, measuring an embedded wireless device's receiver performance can use a network simulator in a shielded radio frequency environment. A network simulator is used to establish a test call from the emulator to the embedded wireless device using an over-the-air antenna inside an RF shielded chamber. The receiver performance is measured by monitoring errors in the wireless link from the network emulator to the wireless device (e.g., Packet Error Rate, Frame Error Rate, Bit Error Rate, and Symbol Error Rate). The signal level from the network emulator is adjusted until the target wireless link error rate is established. Each time the network emulator is adjusted, the error link measurement cycle requires 300 to 1000 data packets (or frames or bits) to get statistically significant measurement of receiver performance. These methods require expensive network simulators and take a long time to find the target link error rate at multiple channels.

As yet another example, it has been proposed that a spectrum analyzer can be connected to an antenna of an embedded wireless module in a device such as a laptop or notebook computer. The spectrum analyzer can detect a noise profile by scanning the signals received by the antenna. Analyzing the raw data poses certain challenges. Another challenge is testing uncertainties introduced by the invasive nature of testing with a spectrum analyzer. Disassembly to insert a cable to an embedded antenna can violate the integrity of the device, changing characteristics of the device itself, changing a grounding state of the device, and posing impedance matching problems.

DETAILED DESCRIPTION

Figure 1:
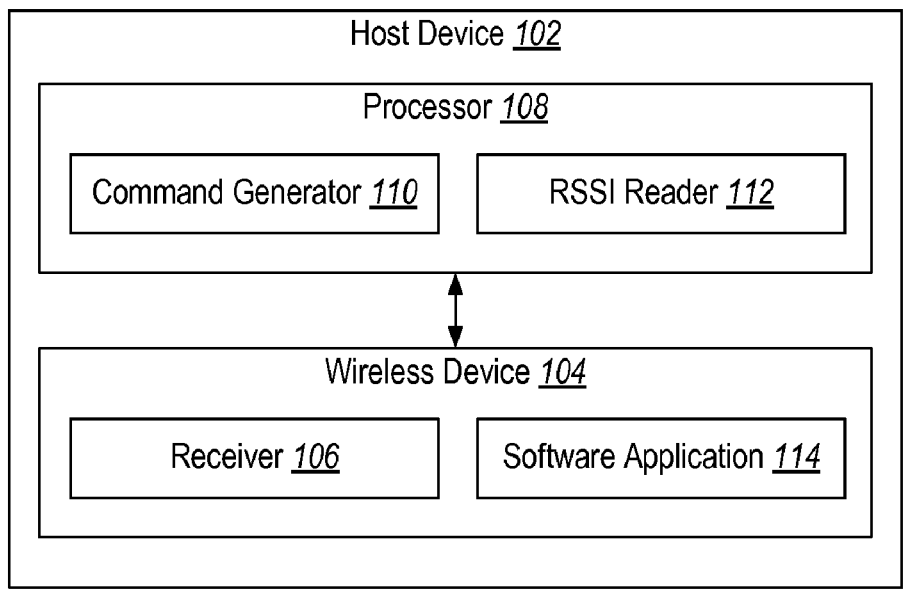
FIG. 1 is a block diagram illustrating one example of a host device with an embedded wireless device.

The word "exemplary" is used herein to mean "serving as an example, instance, or illustration." Any embodiment described herein as "exemplary" is not necessarily to be construed as preferred or advantageous over other embodiments.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well known structures and devices are shown in block diagram form in order to avoid obscuring the novelty of the exemplary embodiments presented herein.

Exemplary embodiments of the invention include an embedded receiver-based noise floor profiling for rapid assessment of device self-interference. Leveraging a linear, calibrated receiver that is used for other purposes in an integrated device (e.g., wireless network transceiver for a laptop) can determine self-interference without a lengthy, expensive Total Isotropic Sensitivity (TIS) test nor intrusive, problematic frequency analyzers that fail to discount noise that does not couple through an antenna of the embedded receiver. This ability to rapidly assess a noise profile can allow validation of a configuration similar to a TIS validated configuration by comparing a noise profile testing (NPT) for both configurations. For example, given that a prior configuration ("parent") of an integrated device has been similarly tested by noise profile testing from an embedded receiver module for radiated performance and validated by TIS testing, a modified configuration ("child") can be rapidly assessed by determining that a noise profile from sources within the device as measured on an embedded receiver module are better than, or within an acceptable margin, of the parent configuration.

In an exemplary embodiment, a method is provided for testing receiver sensitivity. A wireless device is embedded in a host device. The host device is placed in a radio frequency (RF) shielded chamber. Noise emitting components are activated in the host device. The wireless device is controlled to measure received power in a plurality of radio frequencies.

In another exemplary embodiment, at least one processor is provided for testing receiver sensitivity of a receiver embedded in a host device placed in a radio frequency shielded chamber. A first module activates noise emitting components in the host device. A second module controls the wireless device to measure received power in a plurality of radio frequencies. A third module records a plurality of data samples over time for each of the plurality of radio frequencies in local storage of the host device.

In an additional exemplary embodiment, a computer program product is provided for testing receiver sensitivity of a receiver embedded in a host device placed in a radio frequency shielded chamber. A first set of codes causes a computer to activate noise emitting components in the host device. A second set of codes causes the computer to control the wireless device to measure received power in a plurality of radio frequencies. A third set of codes causes the computer to record a plurality of data samples over time for each of the plurality of radio frequencies in local storage of the host device.

In a further exemplary embodiment, an apparatus is provided for testing receiver sensitivity of a receiver embedded in a host device placed in a radio frequency shielded chamber. Means are provided for activating noise emitting components in the host device. Means are provided for controlling the wireless device to measure received power in a plurality of radio frequencies. Means are provided for recording a plurality of data samples over time for each of the plurality of radio frequencies in local storage of the host device.

In yet another exemplary embodiment, an apparatus is provided for testing receiver sensitivity of an embedded receiver. A radio frequency (RF) shielded chamber is used to encompass a host device comprising an embedded wireless device. A noise profile testing component activates noise emitting components in the host device and controls the wireless device to measure received power in a plurality of radio frequencies.

The present systems and methods predict the impact that a host device has on an embedded wireless device's receive performance by recording the wireless device's receiver (RX) received power (e.g., automatic gain control (AGC), received signal strength indicator (RSSI), etc.) when the embedded device is located in the host. In one example, no carrier or pilot signal is used in predicting the impact. The present systems and methods allow the wireless device's receiver to monitor its own RSSI when the wireless device is embedded in a host device that emits any type of radiated noise. For receivers that do not provide RSS referenced to absolute power, an external reference tone can be used in order to scale the measured receiver carrier to noise or signal to noise data to an absolute power. The increase in measured RSSI on the wireless device's receiver correlates to the impact the host device will have on the embedded wireless device's receiver sensitivity performance. The present systems and methods are faster and use less external equipment than current systems and methods. For example, current systems and methods use external equipment to simulate the wireless device's forward link signal.

Total Isotropic Sensitivity (TIS), the measure of radiated receiver performance that is performed upon a new configuration ("parent") is influenced principally by three factors: (1) The conducted sensitivity of the equipment-under-test's (EUT) receiver; (2) The efficiency of the EUT's (equipment under test) receive antenna; and (3) Receiver desense due to radiated self-interference from the integrated EUT. There exist several test conditions where (1) and (2) can be assumed invariant, leaving self-interference as the only variable which impacts radiated receiver performance. For example, the formal testing-defined intermediate frequency (IF) test (e.g., CTIA-defined IF test) for receiver performance consists of quick assessments of peak sensitivity relative to that observed at the closest frequency at which TIS was fully measured. Underlying this test method is the assumption that conducted receiver performance and antenna efficiency do not change significantly between the intermediate frequency under test and the nearest fully-measured frequency.

Ostensibly, the objective of this test is to detect in-band interferers produced by the integrated EUT at frequencies where full TIS was not performed. Because the absolute respective contributions of (1), (2), and (3) to the measured TIS are not known, this test is only meaningful as a relative measure—the measurements at intermediate frequencies must always be referenced to the most closely (in frequency) measured TIS value.

Another potential application of this concept is to evaluate multiple variants within a family of devices using identical receiver hardware and antenna designs. For example, such device families are common among notebook computers containing embedded wireless (e.g., WWAN) modules and antennas. In this case, an identical WWAN module and antenna specification are used across a family of products. However, each member of the family may possess different form factors or may be comprised of non-identical subcomponents such as different liquid crystal diode (LCD) displays, central processing unit (CPUs), etc. As in the previous example, the conducted sensitivity and antenna efficiency are expected to be unchanged across members of this device family. However, the self-interference factor may vary among family members due to potentially different RF emission characteristics of their respective subcomponents or different coupling paths between noisy subcomponents and the WWAN receiver input.

The intermediate frequency test assesses self-interference by means of a relative measure of peak radiated sensitivity. Alternatively, a similar goal may be accomplished using the EUT's own receiver. The ability to tune a receiver to a particular frequency and report the measured power level is a universal feature of all WWAN receivers, regardless of the air interface standard. For example, quantities such as Received Signal Strength Indicator (RSSI) and RXLEV are used universally for system detection and acquisition, open loop power control, handoff negotiation, and automatic gain control. In a test environment isolated from all external sources of RF energy such as local cellular networks, this feature provides a measure of the ambient noise level, which is comprised of thermal noise in the EUT receiver plus any interference produced by the integrated device itself.

It has been found that an appropriate estimate for noise can be determined without performing a rigorous spatial integral.

$$EIS_x(\theta, \phi) = \frac{P_s \cdot \Delta N_0}{G_x(\theta, \phi)} \quad \text{Eqn. (1)}$$

$$\begin{cases} P_s = \text{conducted sensitivity} \\ G_x(\theta, \varphi) = \text{antenna gain pattern relative to isotropic (polarization } x) \\ \Delta N_o = \text{noise floor elevation due to radiated self-jammers } (AWGN) \end{cases}$$

Substituting into TIS expression:

$$TIS = \frac{4\pi}{\oint \left[\frac{1}{EIS_\theta(\theta, \phi)} + \frac{1}{EIS_\phi(\theta, \phi)}\right]\sin(\theta)d\theta d\phi} = \quad \text{Eqn. (2)}$$

$$\frac{P_s \cdot \Delta N_0}{\frac{1}{4\pi}\oint [G_\theta(\theta, \phi) + G_\phi(\theta, \phi)]\sin(\theta)d\theta d\phi} = \frac{P_s \cdot \Delta N_0}{\eta}$$

where η is the antenna efficiency, which is unchanged across minor variants of the same EUT. Once a reference device has undergone full TIS, subsequent minor variants can be evaluated on the basis of noise floor elevation alone by making a reasonable assumption that conductivity sensitivity and antenna efficiency are unchanged. Alternatively, noise floor profiling can identify worst-case candidates for full TIS.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Turning to the Drawings, FIG. 1 is an exemplary block diagram illustrating one example of a wireless device 104 that is embedded into a host device 102 with a processor 108. For example, the wireless device 104 may be a code division multiple access (CDMA) radio modem, and the host device 102 may be a laptop computer. Exemplary embodiments of the invention allow a user to quickly determine the impact the noise of the host device 102 has on a receiver 106 of the wireless device 104.

In one example, the host device 102 (e.g., laptop) is placed in a radio frequency (RF) shielded environment. The host device 102 may be turned on into an active state where the processor 108 is running. The wireless device 104 may also be turned on to an active receive state (e.g., where the receiver 106 is measuring the energy on the current receiver channel). The wireless device 104 may be programmed to each and every channel in the receive band of the device 104. At each channel, a measurement of received power (e.g., AGC, RSSI, etc.) is recorded for the wireless device 104. For example, in certain implemented modes, AGC measurements are used to determine RSSI.

In one example, no other external equipment or signal sources are used. The only active device, other than the wireless device 104, is the host device 102. All the energy measured for the wireless device 104 (as indicated by the RSSI of the device 104) comes from the host device 102.

Exemplary embodiments of the invention use the processor 108 of the host device 102 to control the embedded wireless device 104. The processor 108 may include a command generator 110 and an RSSI reader 112. The command generator 110 may generate commands that the processor 108 can issue over a communication port (e.g., universal serial bus (USB), serial or Peripheral Component Interconnect (PCI)) to the wireless device 104. The commands may be used to set the channel of the receiver 106 for the wireless device 104. The RSSI reader 112 may then read the RSSI for that channel across an interface between the processor 108 and the wireless device 104. This process may be repeated for all applicable frequency bands and frequency channels.

A receive test to monitor the embedded wireless device 104 on a single channel may be as short as one data packet or frame length. Alternatively, an embedded software application 114 (e.g. Binary Runtime Environment for Wireless (BREW) application) may be running on the wireless device 104 to control and record the wireless receiver data so a communication link directly from the processor 108 to the wireless device 104 is not needed.

In one example, a calibration is added to improve the accuracy of the test and account for antenna gain patterns. A standard signal generator may be used to drive a sine wave through an antenna inside the RF shielded chamber at a constant amplitude above the noise generated by the host device 102. The RSSI of the wireless device 104 may be recorded at every frequency across the receive band. A table of signal generator output power versus RSSI across the receive band may act as the correlation factor for the RSSI across the receive band. The correlation factor may also calibrate the wireless device's antenna pattern gain variations.

Furthermore, the techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2). These various radio technologies and standards are known in the art.

Figure 2:
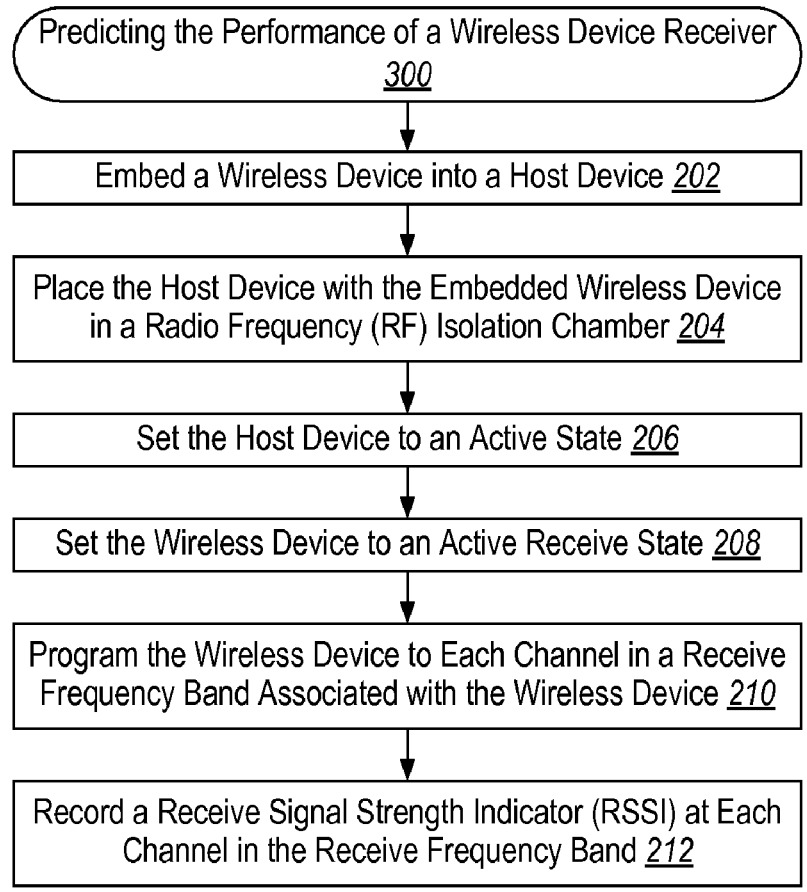
FIG. 2 is a flow chart illustrating one example of a method for predicting the performance of a wireless device receiver.

FIG. 2 illustrates exemplary methodologies and/or flow diagrams in accordance with the claimed subject matter. For simplicity of explanation, the exemplary methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 2 is a flow chart of one example of a method 200 for predicting the performance of a wireless device receiver. A wireless device may be embedded 202 into a host device. The host device, with the embedded wireless device, may be placed 204 in an RF isolation chamber. The host device may be turned on and set 206 to an active state. The wireless device may also be turned on and set 208 to an active receive state. The wireless device may be programmed 210 to each channel in a receive frequency band that is associated with the wireless device. A RSSI may be recorded 212 at each channel in the receive frequency band.

Figure 3:
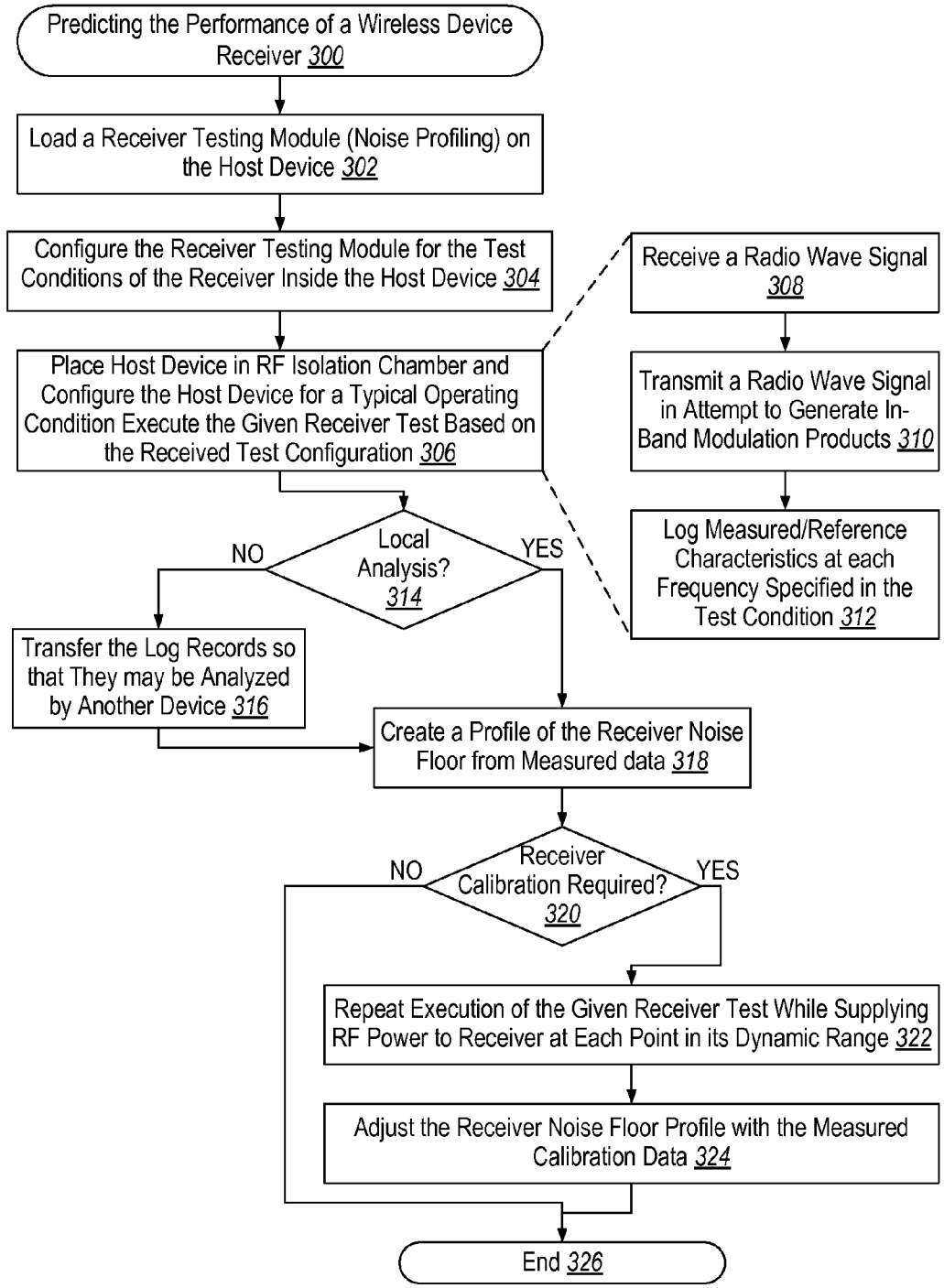
FIG. 3 is a flow chart illustrating another example of a method for predicting the performance of the wireless device receiver.

FIG. 3 is a flow chart of another example of a method 300 for predicting the performance of a wireless device receiver. A receiver testing module (e.g., noise profiling) may be loaded 302 on a host device. The receiver testing module may be configured 304 for the test conditions of the receiver inside the host device. The host device may be placed 306 in an RF isolation chamber. In one example, the host device is configured for a typical operating condition. The receiver test may be executed based on the receiver test configuration. To execute the test, a radio wave signal may be received 308. A radio wave signal may be transmitted 310 in an attempt to generate in-band modulation products. Measured/reference characteristics may be logged 312 at each frequency specified in the test condition.

In one example, a determination 314 is made as to whether local analysis is implemented. If local analysis is not implemented, the log records may be transferred 316 so that they may be analyzed by another device. If local analysis is implemented, a profile of the receiver noise floor from the measured data may be created 318. A determination 320 may be made as to whether receiver calibration is needed. If receiver calibration is not needed, the method 300 may end. If receiver calibration is needed, execution of the given receiver test may be repeated 322 while supplying RF power to the receiver at each point in its dynamic range. In addition, the receiver noise floor profile may be adjusted 324 with the measure calibration data.

Figure 4:
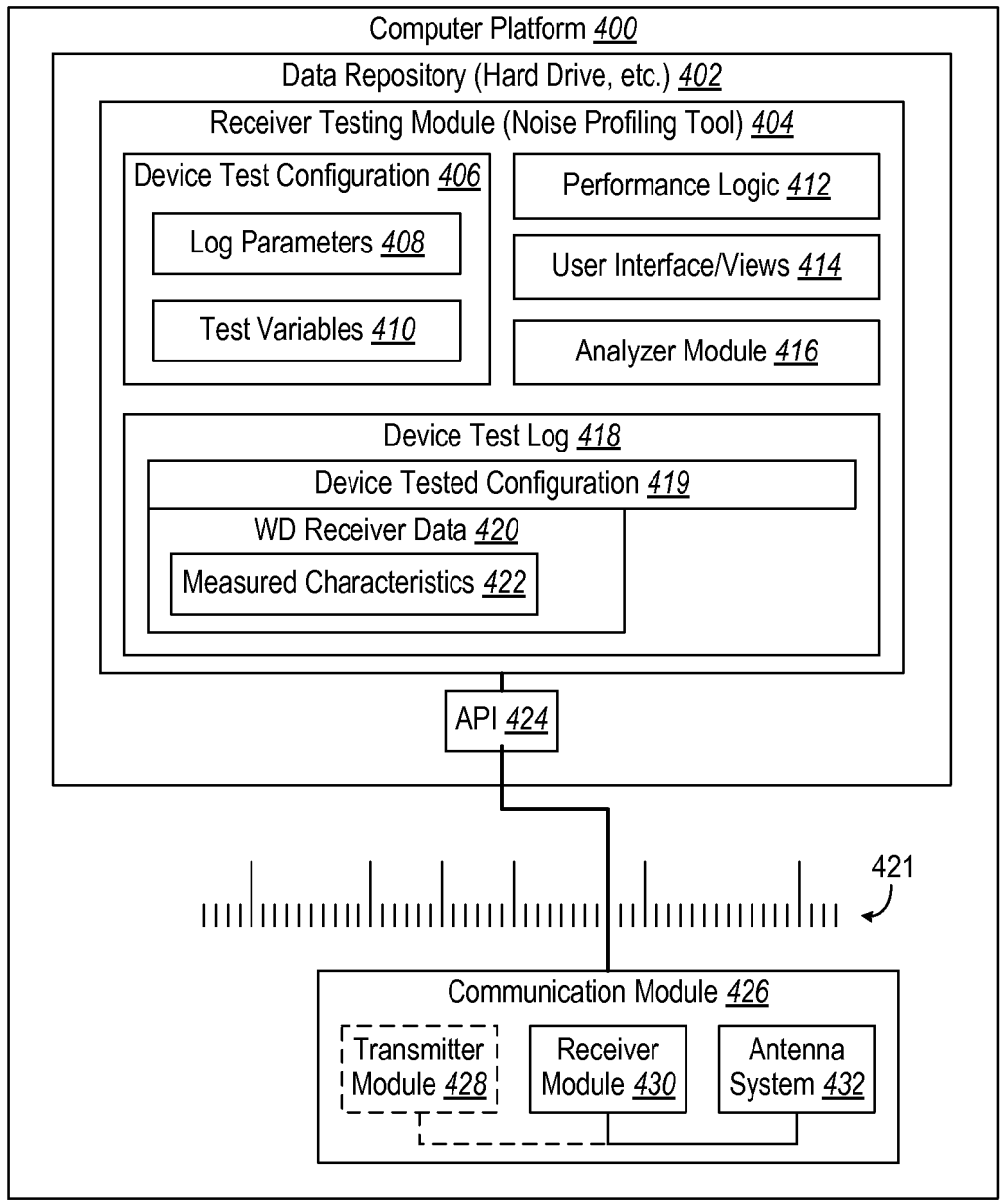
FIG. 4 is a block diagram illustrating one example of components used to predict the performance of the wireless device receiver.

FIG. 4 is a block diagram illustrating one example of components used to predict the performance of the wireless device receiver. A computer platform 400 may include a data repository 402 (e.g., hard drive). The repository 402 may include a receiver testing module 404. The module 404 may be a noise profiling tool. The module 404 may include device test configurations 406 that include log parameters 408 and test variables 410. The receiver testing module 404 may further include performance logic 412, user interface/views 414 and an analyzer module 416.

In one example, the receiver testing module 404 further includes a device test log 418. The test log 418 may include a device tested configuration 419. The tested configuration 419 includes wireless device receiver data 420 that is measured at each channel in the frequency band of the wireless device, as depicted at 421. This data may be stored as measured characters 422. An application programming interface (API) 424 may be used to interface with a communication module 426. The communication module 426 may include a transmitter module 428, a receiver module 430 and an antenna system 432.

Figure 5:
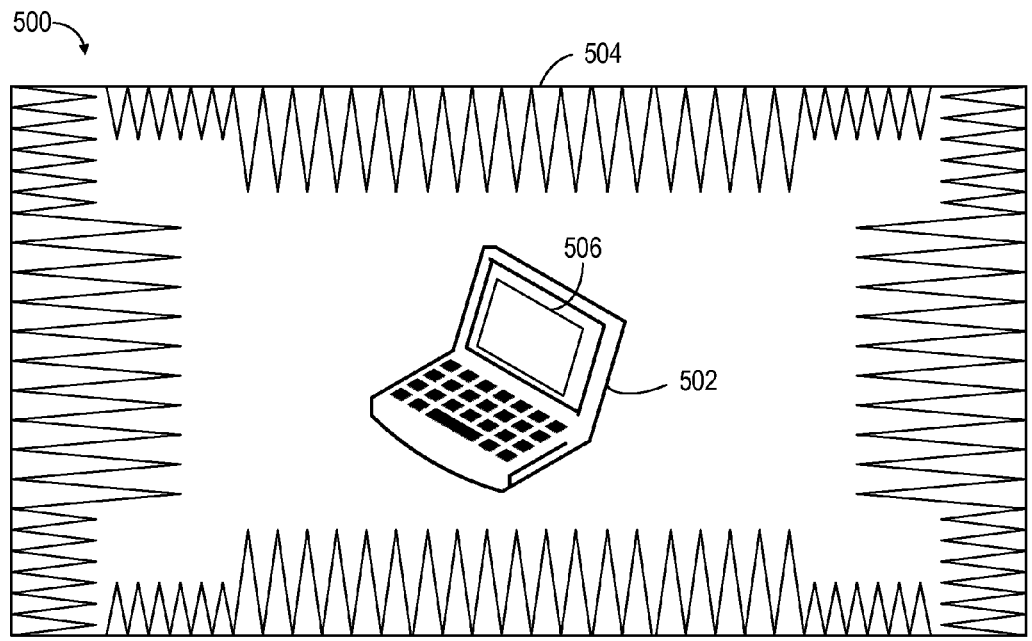
FIG. 5 is a diagram of an example of an environment in which the present systems and methods could be implemented, depicting a standalone device under test in an anechoic chamber.

FIG. 5 is an example of an environment 500 in which the present systems and methods could be implemented. A host device 502 may be placed in an RF isolation test chamber 504. The host device 502 may include an embedded device (not shown) and a test module (such as the noise profiling test), depicted as a GUI window 506. The host device 502 may be the only device in the chamber 504 and the device 502 may include no connections to other devices or equipment, such as incorporating a noise profile testing (NPT) application 506 that executes the tests and stores the data. For a laptop device 502 as depicted, a standard lid open angle, such as 110°, can be used.

In an exemplary embodiment discussed below, a computer usage model is employed as a representative baseline for noise generation. In particular, routine processes are repetitively exercise (e.g., file saves, drawing charts, performing spreadsheet calculations, etc.). This routine allows for benchmarking across configurations and provides a realistic, if worst-case scenario, for expected noise profiling. In particular, noise sources are activated, such as CPU, memory, busses, hard drives, displays, cooling fans, etc. The computer usage model can further encompass heat soaking, cold soaking the hardware, or otherwise dictating a minimum or maximum operating time prior to commencing a test. Thereby, contributions due to thermal loads on various components of the host device 502 can be standardized.

Alternatively or in addition, the NPT application 506 can place the host device 502 into a factory test mode wherein various components can be individually controlled at a low level. A baseline configuration generally exercises a wide range of potential noise emitting sources, such as a display, hard drive motors, processors, cooling fans, etc. It should be appreciated that the baseline configuration can be achieved by a dynamic, automated routine that activates various permutations of available components on the host device 502 to determine the individual contributions made by each device to the noise profile. Alternatively or in addition, the dynamic, automated routine can determine the available components for a particular configuration and ascertain analytically and/or empirically a combination that achieves a desired noise profile. For example, a worst-case noise profile can be determined. As another example, a worst-case noise profile can be determined that is reasonably achievable during operational use for a given configuration. As yet another example, a best-case noise profile can be determined, such as for use as a comparison point.

Exemplary embodiments of the invention may be implemented for linear and non-linear receivers. A calibration table of the receiver dynamic range may be created either before or after the test. The measured data from the test may be scaled and inserted into the calibration table.

The embedded wireless device may not have a reverse link (e.g. a MediaFLO broadcast receiver). The embedded device may be embedded in a laptop computer. The exemplary embodiments of the invention may also be implemented to test a standalone device (e.g., smartphone), a black box device that includes an embedded receiver (e.g., meter reader), etc. Data storage may be on an external hard drive. Data may be transmitted via Bluetooth or other wireless technology. The exemplary embodiments of the invention may be implemented for the full dynamic range and all receiver gain settings of the embedded wireless device.

Exemplary embodiments of the invention allow a user to correlate the wireless device's RSSI in its receive band to its receive sensitivity. The exemplary embodiments of the invention achieve the stated advantages by collecting the data without requiring any external test equipment. This reduces test cost. It also allows faster measurement time by collecting only RX AGC (or RSSI) instead of collecting wireless link error rates (e.g., RSSI vs. BER/PER/SER/FER).

Additionally, many host device manufacturers are not equipped to perform standard receiver quality measurements. For example, laptop vendors do not have anechoic chambers to perform precise receive sensitivity measurements on a CDMA or UMTS module embedded in their laptops. This test method, explained by the present systems and methods, allows them to measure the interference that their laptop causes to the embedded modem in a standard EMC chamber.

Figure 6:
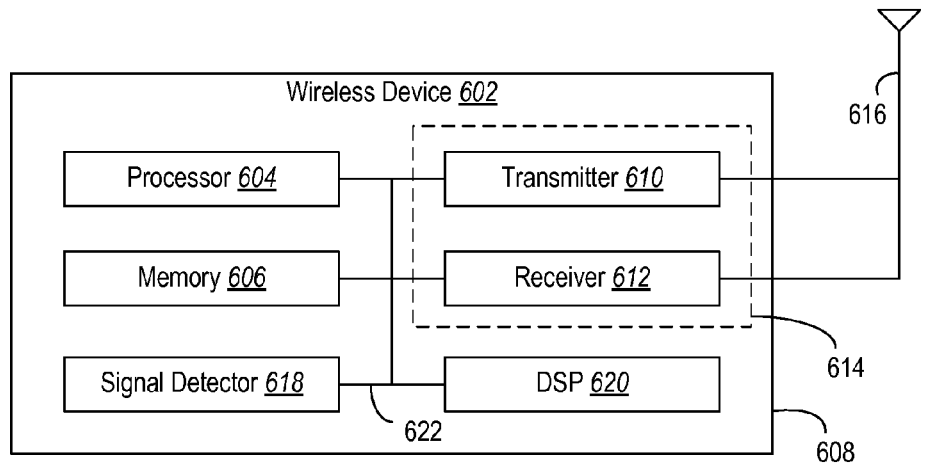
FIG. 6 is a block diagram of various components that may be utilized in a wireless communication device.

FIG. 6 illustrates various components that may be utilized in a wireless communication device 602. The wireless communication device 602 is an example of a device that may be configured to implement the various methods described herein.

The wireless communication device 602 may include a processor 604 which controls operation of the wireless communication device 602. The processor 604 may also be referred to as a central processing unit (CPU). Memory 606, which may include both read-only memory (ROM) and random access memory (RAM), provides instructions and data to the processor 604. A portion of the memory 606 may also include non-volatile random access memory (NVRAM). The processor 604 typically performs logical and arithmetic operations based on program instructions stored within the memory 606. The instructions in the memory 606 may be executable to implement the methods described herein.

The wireless communication device 602 may also include a housing 608 that may include a transmitter 610 and a receiver 612 to allow transmission and reception of data between the wireless communication device 602 and a remote location. The transmitter 610 and receiver 612 may be combined into a transceiver 614. An antenna 616 may be attached to the housing 608 and electrically coupled to the transceiver 614. The wireless communication device 602 may also include (not shown) multiple transmitters, multiple receivers, multiple transceivers and/or multiple antenna.

The wireless communication device 602 may also include a signal detector 618 that may be used to detect and quantify the level of signals received by the transceiver 614. The signal detector 618 may detect such signals as total energy, pilot energy per pseudo noise (PN) chips, power spectral density, and other signals. The wireless communication device 602 may also include a digital signal processor (DSP) 620 for use in processing signals.

The various components of the wireless communication device 602 may be coupled together by a bus system 622 which may include a power bus, a control signal bus, and a status signal bus in addition to a data bus. However, for the sake of clarity, the various busses are illustrated in FIG. 6 as the bus system 622.

Figure 7:
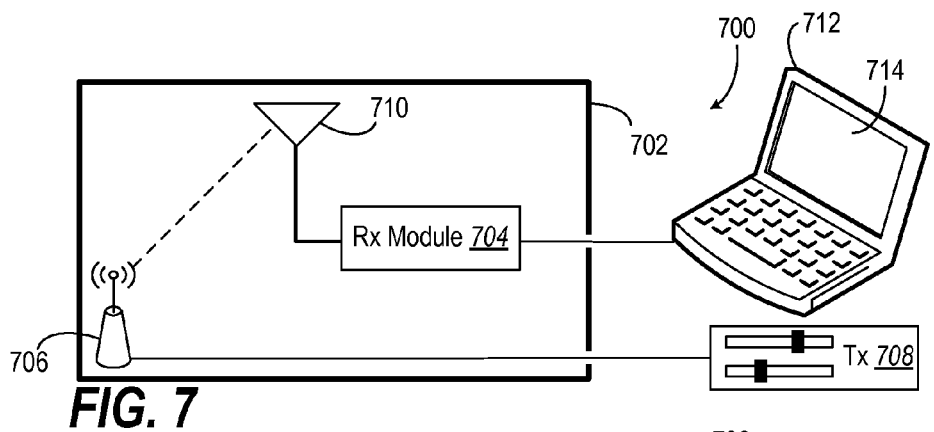
FIG. 7 is block diagram of a receiver module being calibrated within a shielded environment prior to being embedded in a device for noise profile testing (NPT)

In FIG. 7, a noise profiling system 700 includes an RF shielded environment 702 (e.g., anechoic chamber). A receiver module 704 intended for an embedded role in an integrated device can advantageously have a highly linear and calibrated capability to scan RF frequencies. If already calibrated, even if not particularly linear, then any needed measurement adjustments as a function of frequency and dynamic range are known. For a very linear device, calibrating received power at one received power level can be used to calibrate readings at other power levels in the dynamic range. In such instances, testing of the receiver module 704 can be limited to a single frequency reception test as installed, verifying received power of a known power transmission. In other instances, the receiver module 704 can have an unknown linearity and calibration of sensing received power (e.g., RSSI). Generally, the best reception sensitivity is achieved for the receiver module 704 tested separately, as depicted in FIG. 7, by providing an RF noise source 706 having a known radiated power, depicted as a selectable transmission power and frequency at 708. An antenna 710 used by, or integral to, the receiver module 704 receives this radiated power to test calibration. If the antenna directivity is known, the noise source 706 can be aligned along a maximum antenna gain direction, or the receiver module 704 can be tested at various directions relative to the noise source 706 to find a maximum. A noise profiling test (NPT) application 712 executed on a computing platform, depicted as a laptop 714, can be connected via cabling 716 into the shielded environment 702. Alternatively, test equipment that can read the sensed received power from the receiver module 704 can be used.

In an exemplary embodiment, prior to formal testing, the power reported by the receiver must be calibrated to a known conducted signal source, such as a signal generator or cell-site simulator. Linearity can be verified at two power levels at least 10 dB apart and at least 10 dB above the thermal noise floor of the wireless receiver. Calibration can be verified at all frequency channels specified by the noise profiling procedure. If adjustments are necessary, they can be implemented in the calibration tables internal to the EUT whenever possible, rather than in post-processing of the noise profile data. Received power samples recorded by the noise profiling application can be accurate within ±0.5 dB. Within a family of devices using identical receiver hardware, it is only necessary to perform the calibration once.

Figure 8:
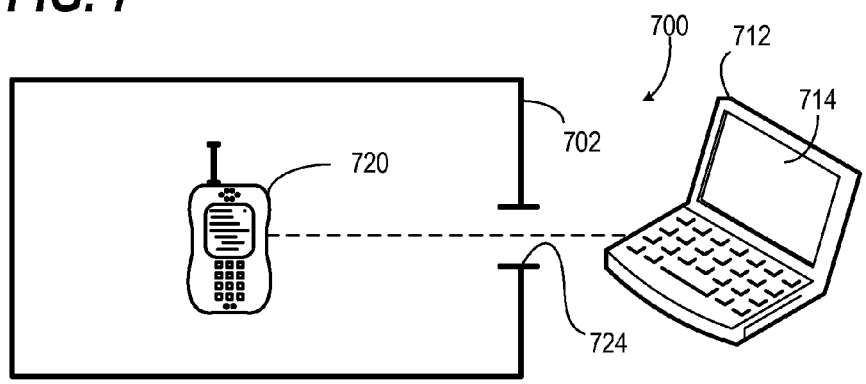
FIG. 8 is a block diagram of device with an embedded receiver being tested in a shielded environment under remote wireless control.

In FIG. 8, the noise profiling system 700 can be used to provide a noise profile of an integrated device 720 having an embedded receiver module (not shown in FIG. 8) that has sufficient linearity and calibration for use to scan a range of radio frequencies of interest and to measure received noise power. This calibration can be verified or determined such as depicted in FIG. 7. The test arrangement depicted in FIG. 8 provides additional aspects suitable for certain instances. For example, rather than executing the NPT application 712 on the integrated device 720 itself, the NPT application 714 can be remotely executed, such as on the laptop 714. This can be appropriate for certain integrated devices having computing or user interface constraints that make this appropriate. For example, certain portable devices have sufficient processing capabilities to perform the noise profiling, but it may not be convenient to adapt such methodologies to a different computing platform, given the additional development cost. Alternatively, the processing/interface capabilities can be too limited for such implementation.

Capabilities of the NPT application 712 can include: (1) configuring the mode and band of the EUT receiver; (2) tuning the EUT receiver to a specified RF channel; (3) placing the EUT receiver into its highest gain state; (4) reading a configurable number of samples of received power level reported by the receiver at the tuned frequency; programmable to tune the receiver to a predetermined sequence of RF channels and read power levels at each of those channels; (4) acquiring power data from all diversity receive chains, if present; (5) storing the received power and supporting data in a comma-delimited text file for post-processing and analysis; (6) real-time plotting of received power data versus frequency; (7) synchronized General Purpose Interface Bus (GPIB) control of a signal generator for swept calibration of the received power levels; (8) enabling and sweeping the wireless (e.g., WWAN) transmitter during receiver data collection; (9) supporting scripting for automating of multiband, multimode, and repeatability testing; and (10) and configuring a time delay between enabling of the application and commencement of data collection.

Thus, the NPT application 714 can place the integrated device 502, 720 in a computer usage model in order to achieve like conditions across multiple configurations. Standardization can be achieved for components that are used repetitively to create a worst-case noise profile (e.g., file reads/saves to a hard drive, causing certain displays to be rendered, etc.) Internal component temperatures can also be standardized by specifying an ambient temperature and limits on operating time. Alternatively, a computer usage model can be achieved using a factory test state, such as a worst case state wherein each potential source of self-generated noise are activated. Examples are performing repeated activations of drive motors, exercising a user interface (e.g., display, audio speakers), and running routines that exercise processors and co-processors as well as various communication busses. Transmitters can also be energized.

Another aspect depicted is a wireless connection 722 between the integrated device 720 and the testing laptop 714. For example, a personal area network (PAN) (e.g., Bluetooth) connection can avoid intrusive cable connection that can change integrity of the device (e.g., grounding state changes). Such a wireless connection 722 can pass through an appropriate conduit 724 or an antenna (not shown) attached inside of the shielded environment 702. The noise contribution for the wireless connection 722 can fall outside of the range of frequencies of interest or otherwise be mitigated.

It should be appreciated with the benefit of the present disclosure that functions of NPT application 712 can be distributed between the host device 502, 720 and a remote testing device, e.g., laptop 714. For example, a limited utility can be present on the host device for gaining sufficient component control with analysis, plotting, and data recording performed by a remote device.

Figure 9:
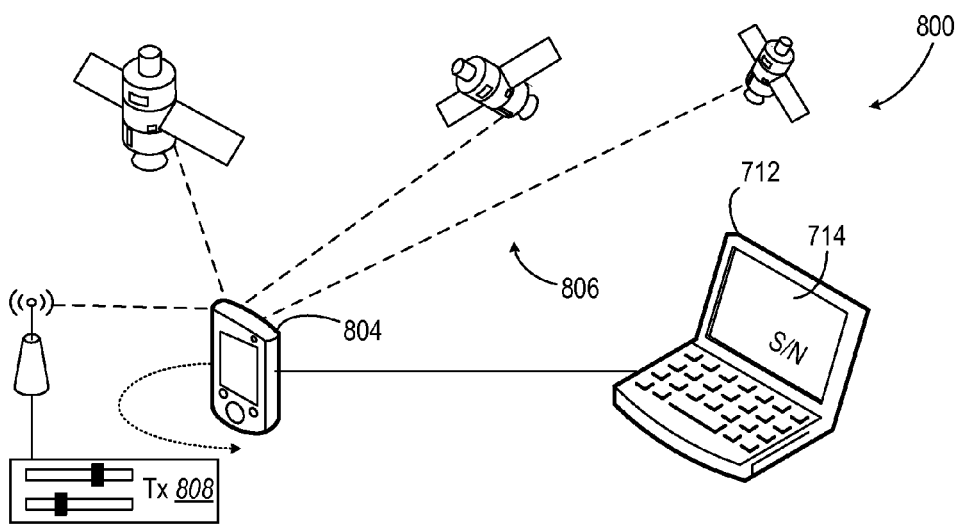
FIG. 9 is a block diagram of a device having an embedded global positioning system (GPS) receiver capable of reporting signal to noise data being noise profile tested.

In FIG. 9, a noise profiling system 800 can include testing within an environment 804 of a receiver module (not shown) that provides signal to noise or carrier to noise measurements rather than an absolute measure corresponding to received power. For example, an integrated device 804 can include an embedded global position system (GPS) receiver that measures signal to noise ratio (SNR). This GPS capability is suggested by a constellation of GPS satellites 806. The device 804 is tested within an environment 804 that avoids spurious external noise, which can include being in a remote environment or being in a shielded environment as depicted in FIGS. 7-8. A known transmitter source 808 generates an appropriate signal for the device 804 to detect, which can include measuring S/N for various frequencies and over different orientations of the device 804. For example, for iterations of a broadcast signal at a known power (e.g., −110 dBm), can a minimum 40 dB S/N be achieved in any iteration if the expected system noise floor is less than −150 dBM or will the presence of any jammers reduce the maximum achievable S/N to less than 40 dB.

Figure 10:
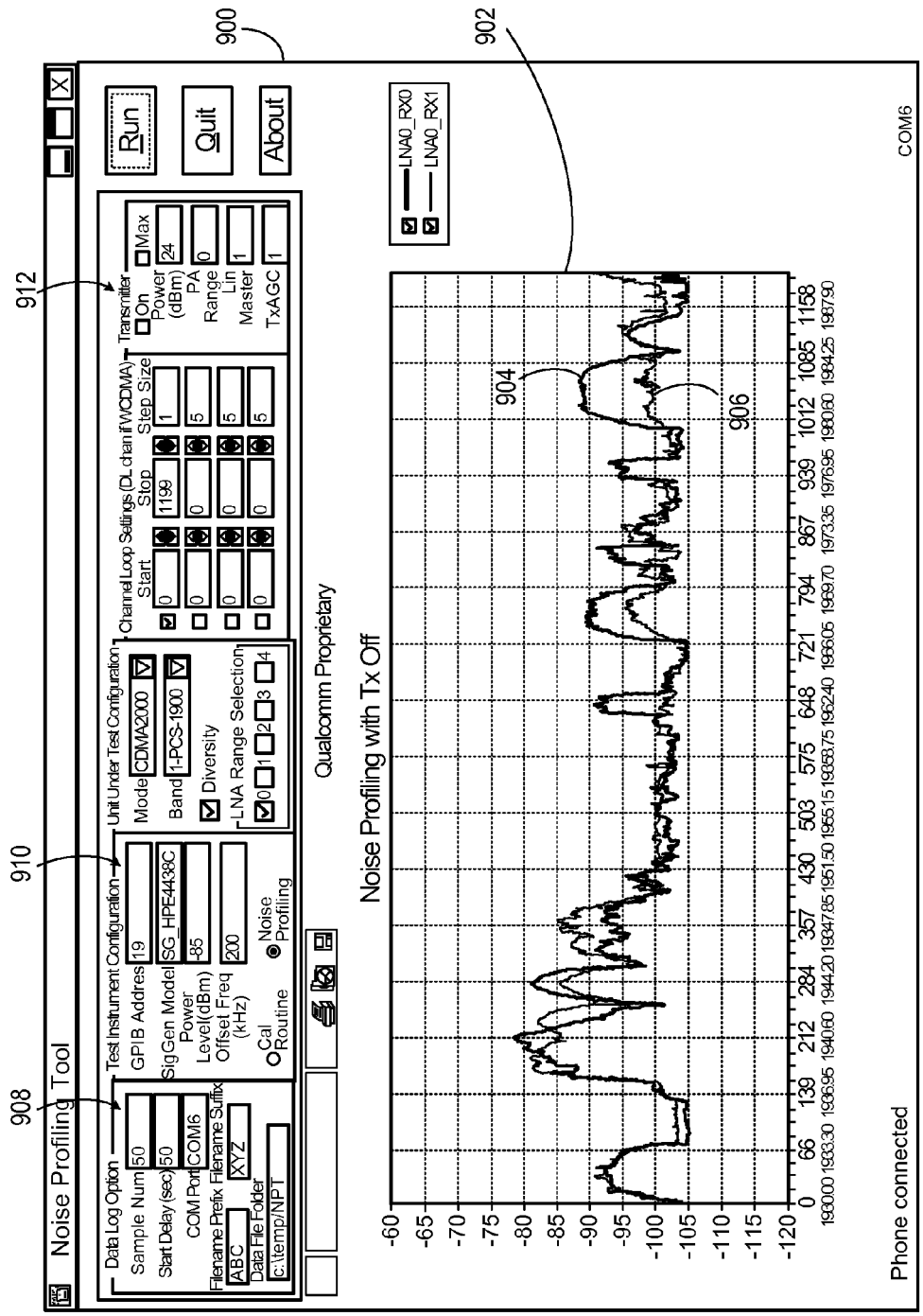
FIG. 10 is a depiction of a graphical user interface (GUI) for the NPT application.

In FIG. 10, an exemplary graphical user interface (GUI) window 900 for noise profiling testing (NPT) can advantageously record and depict frequency channel noise plot 902 for each embedded receiver, depicted at 904 and 906. In order to detect time-dependent noise sources, a number of data samples can be taken for each channel, e.g., 50 as depicted at 908. For situations in which an external jammer is to be used, a test instrument configuration control, depicted at 910, can be specified. In the exemplary embodiment, the embedded receiving module is a wireless module having both a transmitter and a receiver. Use of a transmitter of the wireless module can also be selectively activated by controls depicted at 912.

It should be appreciated that the NPT GUI window 900 can be adapted for various computing platforms. In addition, as used herein, the term "determining" (and grammatical variants thereof) is used in an extremely broad sense. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like. Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

Figure 11:
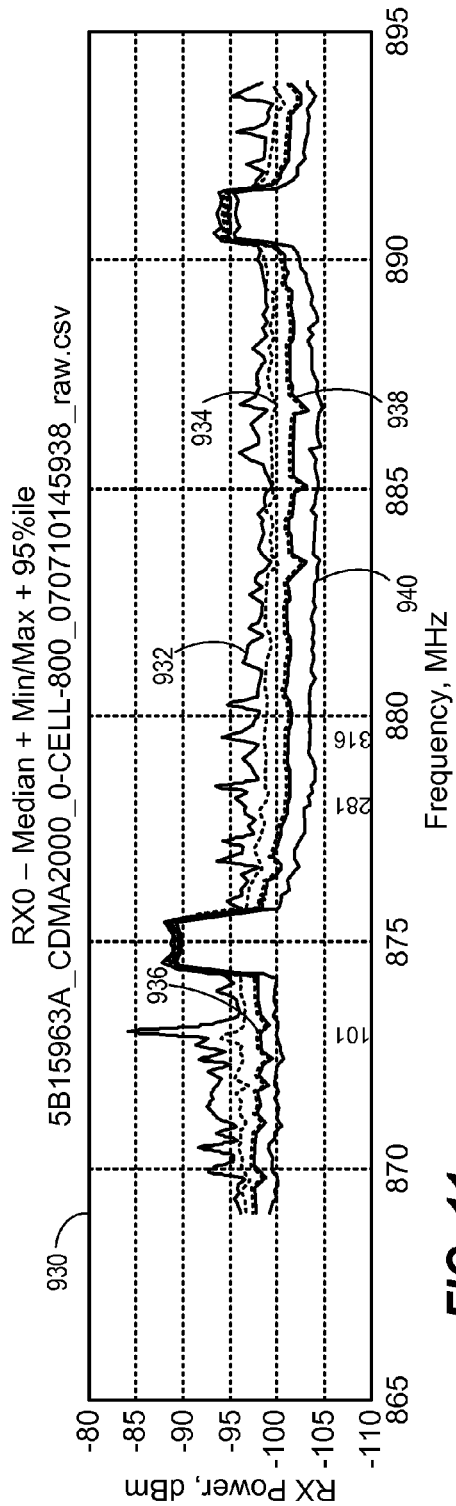
FIG. 11 is a plot of a statistical description of NPT data.

In FIG. 11, noise profile results 930 of an NPT test can be plotted and analyzed with visibility into ambient Gaussian white noise (AWGN) contribution as well as short duration, spurious noise sources, illustrated by a first plot 932 of a maximum values for each channel tested, a $95^{th}$ percentile plot 934, an average plot 936, a median plot 938, and a minimum plot 940. For example, it can be determined for a given application that sufficient noise encoding can handle spurious noise above $95^{th}$ percentile, so the $95^{th}$ percentile is noteworthy for identifying the frequency of spurious noise that can affect receiver sensitivity. In other instances, general performance can be better analyzed with reference to median noise profiles, which ignores spurious noise contributions, unlike an average noise power that is affected by short duration self-interference.

Figure 12:
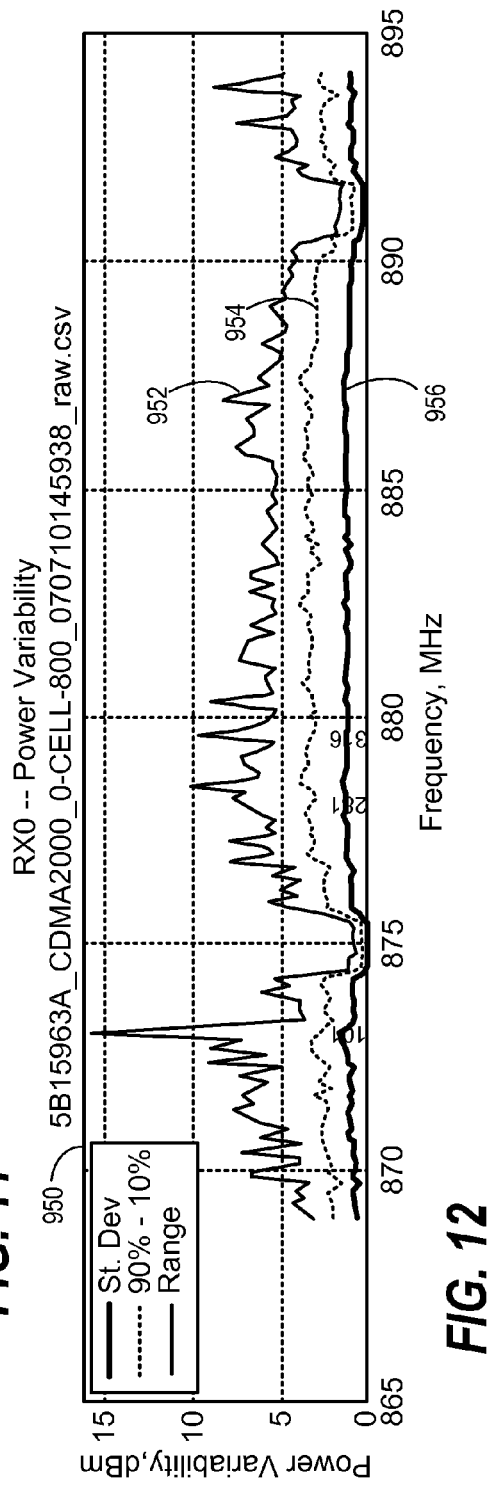
FIG. 12 is a plot of analysis of per-frequency variability of NPT data.

In FIG. 12, a statistical analysis plot 950 of the noise profile data provides a range plot 952, a 90%-to-10% plot 954, and a standard deviation plot 956 to give greater insight into the nature of the self-interference.

Figure 13:
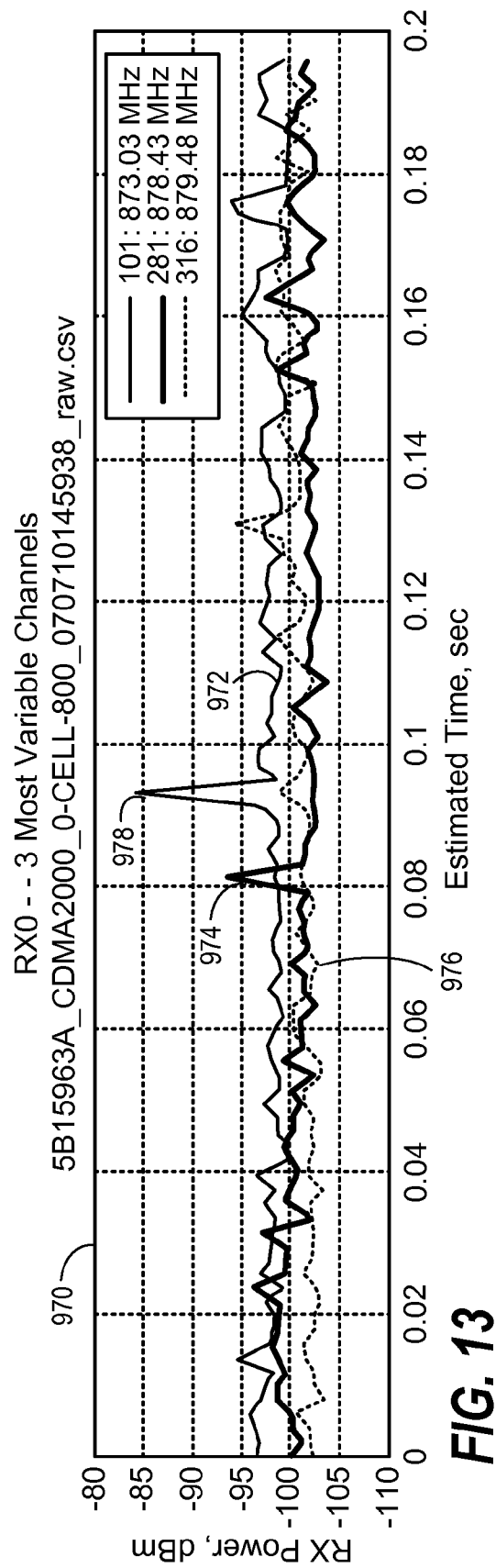
FIG. 13 is a plot of temporal analysis of most-variable channels of NPT data.

In FIG. 13, a time plot 970 for three most variable channels are depicted with a channel #101 plot 972, a channel #281 plot 974, and a channel #316 plot 976, which can be helpful in locating a particular spurious noise source 978 as a function of channel, time and power.

It should be appreciated with the benefit of the present disclosure that other statistical analyses can be selected in addition to, or as an alternative to those depicted. For example, error correction encoding of a WCDMA device can compensate for 10% errors, which can correlate to a $90^{th}$ percentile analyses.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for testing receiver sensitivity of an embedded receiver, comprising:
    embedding a wireless device in a host device;
    placing the host device in a radio frequency (RF) shielded chamber;
    activating noise emitting components in the host device; and
    controlling the wireless device embedded in the host device to measure received power including power generated by the noise-emitting components in the host device at a plurality of radio frequencies.

2. The method of claim 1, further comprising embedding a wireless network transceiver in the host device.

3. The method of claim 1, further comprising recording a plurality of data samples taken over time for each of the plurality of radio frequencies.

4. The method of claim 1, further comprising analyzing the plurality of data samples to plot a percentile graph of the plurality of radio frequencies to distinguish a spurious noise source from an ambient Gaussian white noise source.

5. The method of claim 1, further comprising analyzing the plurality of data samples to plot a time sequence of a most variable radio frequency to characterize a spurious noise source.

6. The method of claim 1, further comprising calibrating the wireless device prior to embedding in the host device.

7. The method of claim 1, further comprising calibrating the wireless device that can report a signal to noise ratio by transmitting a known signal power to wireless device.

8. The method of claim 1, further comprising calibrating a global positioning system (GPS) wireless device.

9. The method of claim 1, further comprising activating noise emitting components in the host device by placing the host device in a factory test mode and individually activating mass storage devices, data busses, a display, and a processor.

10. The method of claim 1, further comprising executing an automated routine to selectively activate noise emitting components in the host device in succession to ascertain contributions to received power by each component.

11. The method of claim 1, further comprising activating noise emitting components in the host device of a general purpose computer by causing repeated file operations to a mass memory storage device and by causing processing and display rendering of an image.

12. The method of claim 1, further comprising remotely controlling the host device to perform noise profile testing.

13. The method of claim 12, further comprising remotely controlling the host device via a wireless communication link.

14. The method of claim 13, further comprising:
performing total isotropic sensitivity (TIS) testing of a similar host device; and
validating the first host device by comparing the noise profile with the similar host device.

15. The method of claim 1, further comprising:
providing an integral testing module executed by a computing platform of the host device; and
configuring a testing delay for automatic testing after sealing of the RF shielded chamber.

16. At least one processor for testing receiver sensitivity of a receiver embedded in a host device placed in a radio frequency shielded chamber, comprising:
a first module for activating noise emitting components in the host device; and
a second module for controlling the wireless device embedded in the host device to measure received power including power generated by the noise-emitting components in the host device at a plurality of radio frequencies; and
a third module for recording a plurality of data samples over time for each of the plurality of radio frequencies in local storage of the host device.

17. A computer program product for testing receiver sensitivity of a receiver embedded in a host device placed in a radio frequency shielded chamber, comprising:
a non-transitory computer-readable medium comprising,
a first set of codes for causing a computer to activate noise emitting components in the host device;
a second set of codes for causing the computer to control the wireless device embedded in the host device to measure received power including power generated by the noise-emitting components in the host device at a plurality of radio frequencies; and
a third set of codes for causing the computer to record a plurality of data samples over time for each of the plurality of radio frequencies in local storage of the host device.

18. An apparatus for testing receiver sensitivity of a receiver embedded in a host device placed in a radio frequency shielded chamber, comprising:
means for activating noise emitting components in the host device;
means for controlling the wireless device embedded in the host device to measure received power including power generated by the noise-emitting components in the host device at a plurality of radio frequencies; and
means for recording a plurality of data samples over time for each of the plurality of radio frequencies in local storage of the host device.

19. An apparatus for testing receiver sensitivity of an embedded receiver, comprising:
a radio frequency (RF) shielded chamber;
a host device comprising an embedded wireless device; and
a noise profile testing component for activating noise emitting components in the host device, and for controlling the wireless device embedded in the host device to measure received power including power generated by the noise-emitting components in the host device at a plurality of radio frequencies.

20. The apparatus of claim 19, wherein the wireless device comprises a wireless network transceiver in the host device.

21. The apparatus of claim 19, further comprising the noise profile testing component recording a plurality of data samples taken over time for each of the plurality of radio frequencies.

22. The apparatus of claim 19, further comprising the noise profile testing component analyzing the plurality of data samples to plot a percentile graph of the plurality of radio frequencies to distinguish a spurious noise source from an ambient Gaussian white noise source.

23. The apparatus of claim 19, further comprising the noise profile testing component analyzing the plurality of data samples to plot a time sequence of a most variable radio frequency to characterize a spurious noise source.

24. The apparatus of claim 19, further comprising the wireless device calibrated prior to embedding in the host device.

25. The apparatus of claim 19, further comprising a test RF emitter having a known power characteristic placed in the shielded chamber for calibrating the wireless device that can report a signal to noise ratio.

26. The apparatus of claim 19, wherein the wireless device comprises a global positioning system (GPS) wireless device.

27. The apparatus of claim 19, wherein the noise profile testing component for placing the host device in a factory test mode and individually activating mass storage devices, data busses, a display, and a processor.

28. The apparatus of claim 19, further comprising the noise profile testing component for executing an automated routine to selectively activate noise emitting components in the host device in succession to ascertain contributions to received power by each component.

29. The apparatus of claim 19, wherein the host device comprises a general purpose computer, the noise profile testing component causing repeated file operations to a mass memory storage device and causing processing and display rendering of an image.

30. The apparatus of claim 19, further comprising a remote device for controlling the host device to perform noise profile testing.

31. The apparatus of claim 30, further comprising a wireless communication link between the host device and the remote device.

32. The apparatus of claim 31, further comprising:
a storage medium containing recorded data of performing total isotropic sensitivity (TIS) testing of a similar host device; and
the noise profile testing component for validating the first host device by comparing the noise profile with the similar host device.

33. The apparatus of claim 19, further comprising the noise profile testing component executing a testing delay for automatic testing after sealing of the RF shielded chamber.

* * * * *